United States Patent [19]
Sadot et al.

[11] Patent Number: 5,337,331
[45] Date of Patent: Aug. 9, 1994

[54] METHOD OF COHERENT DEMODULATION FOR PHASE SHIFT KEYING AND A DEVICE FOR IMPLEMENTING THE METHOD

[75] Inventors: Philippe Sadot, Paris; Bertrand Thebault, Asnieres; Marc Darmon, Paris; Jacques Eudes, Mesnil le Roi, all of France

[73] Assignee: Alcatel Telspace, Nanterre Cedex, France

[21] Appl. No.: 927,399

[22] PCT Filed: Jan. 31, 1992

[86] PCT No.: PCT/FR92/00090
§ 371 Date: Sep. 25, 1992
§ 102(e) Date: Sep. 25, 1992

[87] PCT Pub. No.: WO92/14326
PCT Pub. Date: Aug. 20, 1992

[30] Foreign Application Priority Data
Jan. 31, 1991 [FR] France ................. 91 01079

[51] Int. Cl.⁵ .................... H03D 3/22; H04L 27/22
[52] U.S. Cl. .................................. 375/83; 375/94; 375/118; 329/307

[58] Field of Search ................ 375/83, 94, 118, 120, 375/119, 99, 101, 102; 329/304, 307; 455/180.3; 328/72

[56] References Cited

U.S. PATENT DOCUMENTS

| | | | |
|---|---|---|---|
| 4,246,654 | 1/1981 | Malm | 375/83 |
| 4,599,732 | 7/1986 | LeFever | 375/13 |
| 5,049,830 | 9/1991 | Yoshida | 375/83 |
| 5,128,626 | 7/1992 | Iwasaki | 329/307 |
| 5,208,886 | 5/1993 | Edbauer | 329/304 |

FOREIGN PATENT DOCUMENTS

| | | |
|---|---|---|
| 0258649 | 3/1988 | European Pat. Off. . |
| 0353779 | 2/1990 | European Pat. Off. . |
| 0373405 | 6/1990 | European Pat. Off. . |
| WO8504999 | 11/1985 | World Int. Prop. O. . |
| WO8902200 | 3/1989 | World Int. Prop. O. . |

Primary Examiner—Stephen Chin
Assistant Examiner—Bryan Webster
Attorney, Agent, or Firm—Sughrue, Mion, Zinn, Macpeak & Seas

[57] ABSTRACT

A method and apparatus for coherent demodulation for phase shift keyed signals including:
a phase estimation stage based on a sequence of reference symbols transmitted at the start of each block of data and
a second order phase-locked loop stage.

6 Claims, 1 Drawing Sheet

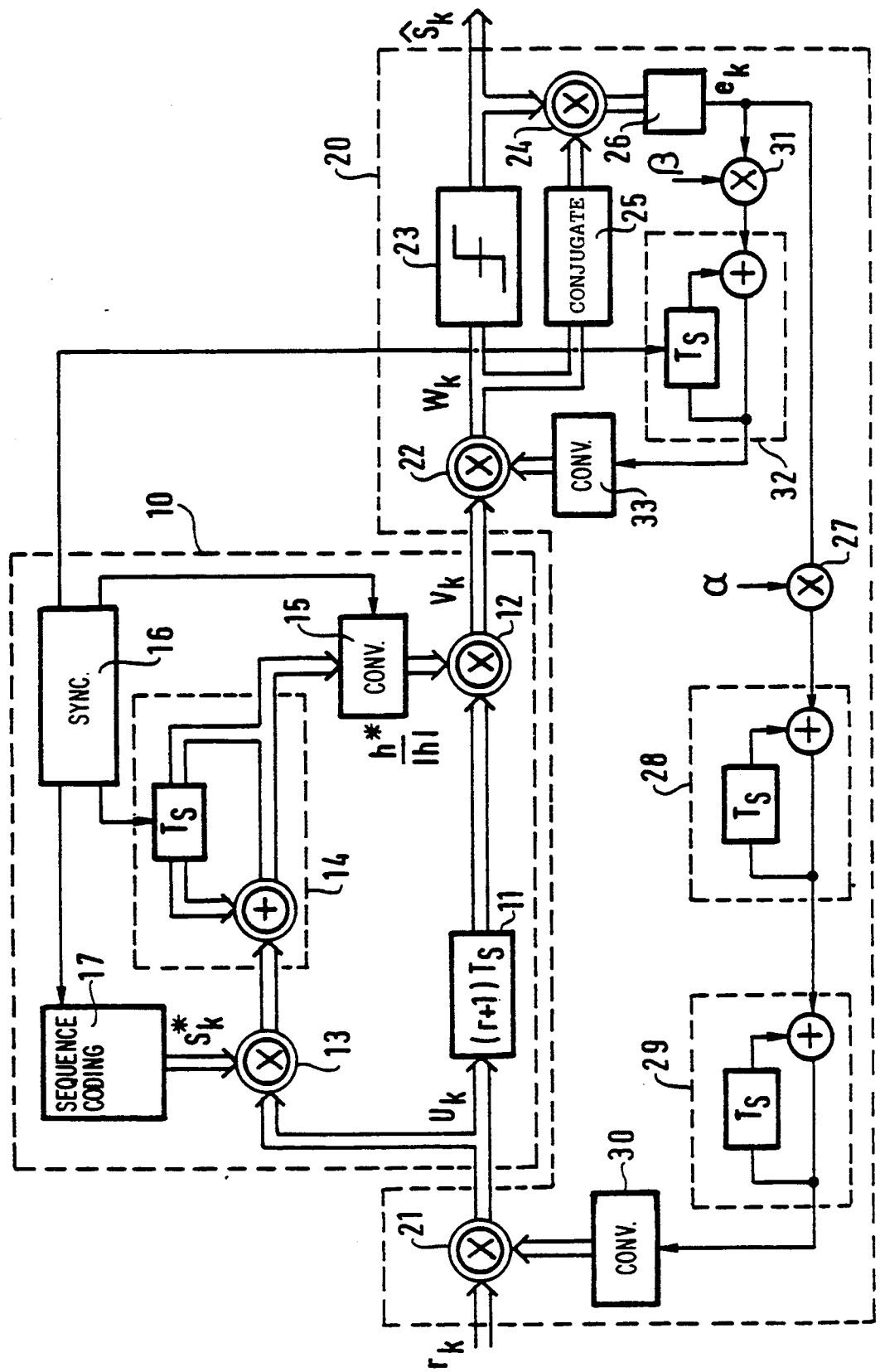

METHOD OF COHERENT DEMODULATION FOR PHASE SHIFT KEYING AND A DEVICE FOR IMPLEMENTING THE METHOD

BACKGROUND OF THE INVENTION

The invention concerns a method of coherent demodulation for phase shift keying and a device for implementing the method.

The invention is thus applicable to transmission systems using type PSK2 or PSK4 modulation for example.

In a current demodulator known in the art, the analog signal at the intermediate frequency $f_i$ is transformed to the base band by multiplication in in-phase and quadrature channels, followed by filtering to remove image frequencies. The signal is then digitized for each channel and, after passing through a matched filter, a baseband signal is obtained, which may be represented by a complex number:

$$r_k = r(kT_s) = g\, exp(j(k\Delta w_1 T_s + \phi_k))s_k + n_k$$

where:
 g is the gain (loss) introduced by the channel;
 $T_s$ is the symbol time;

$$s_k = exp\left(j \frac{2\pi}{M} l\right);$$

$s_k$ being the symbol transmitted at the instant $kT_s$; M representing the number of phase states and l being an integer corresponding to the coded bit or bits;
 $n_k$ is a representation of the white Gaussian noise at the instant $kT_s$;
 $\Delta w_i = 2\pi\Delta f_i$ corresponding to the frequency difference between the transmission and reception oscillators.

If $\delta w = \Delta w_i T_s$ we have:

$$r_k = g\, exp(j(k\delta w + \phi_k))s_k + n_k$$

Putting $h_k = g\, exp(j(k\delta w + \phi_k))$ we get the condensed notation:

$$r_k = h_k s_k + n_k.$$

In demodulation based on channel estimation, the essential condition for good operation is the insertion of R reference symbols (known a priori to the receiver) every I information symbols, so as to form blocks of R+I symbols. The R reference symbols may be identical for each block or equally be constructed on the basis of one (for PSK2) or two (for PSK4) pseudorandom sequences of period $N = 2^m - 1$, such that $m \gg R$. The order of magnitude of R may be around ten and that of I of some tens.

If the channel is slowly varying it can be assumed that $\phi_k = \phi$ and $\delta w \approx 0$, so that in fixing the origin of time for the start of each block we take:

$$h_k = h_{R/2} = h\ for\ k\epsilon\{0, \ldots R-1\}$$

Thanks to the knowledge of the signal received in the interval $[0, \ldots R-1]$ and from the Gaussian nature of the additive noise $n_k$, the variable h can be estimated from the maximum likelihood. This means minimizing a function L defined as follows:

$$L(\hat{h}) = \sum_{k=0}^{R-1} |r_k - \hat{h}s_k|^2$$

We can then calculate the gradient of L relative to $h_r$ and $h_i$, with the notation $h = h_r + jh_i$:

$$G_{hr}(L) = \sum_{k=0}^{R-1} -2Re(r_k s_k^*) + 2h_r|s_k|^2$$

$$G_{hi}(L) = \sum_{k=0}^{R-1} -2Im(r_k s_k^*) + 2h_r|s_k|^2$$

Setting $G_{hr}(L) + jG_{hi}(L)$ to zero we obtain:

$$\hat{h} = \frac{1}{R} \sum_{k=0}^{R-1} r_k s_k^*$$

To effect the coherent demodulation we then perform:

$$s_k = sign\left(r_k \frac{\hat{h}^*}{|\hat{h}|}\right)$$

The demodulation should preserve the power of the received signal; hence the normalization by $|\hat{h}|$.

The advantage of this method of demodulation is the removal of the phase ambiguity, as well as its good resistance to Gaussian noise. It can also be noted that, once the symbol synchronization is acquired, the convergence of the phase estimator is less than the duration of a block, namely $(R+I)T_s$ iterations. The low frequency of the phase estimation makes the method inapplicable when:

$$\Delta wi > \frac{\pi}{15(R+I)T_s}$$

This means a major constraint on the drift of the oscillators.

In loop demodulation, the gradient algorithm is used to minimize an estimation function as described in the article entitled "Simultaneous adaptive estimation and decision algorithm for carrier modulation data transmission systems" by H. Kobayashi, (IEEE Transaction and communication technology; vol COM-19, June 1971, pages 268–280). This estimation function is worked out in order to obtain a decision criterion according to the maximum likelihood.

$$\psi_k arg(h_k) = k\delta w + \phi_k mod 2\pi.$$

In deriving this estimation function an estimate of the phase error is obtained:

$$e_k = Im(sign(z_k)z_k^*)$$

with $$z_k = r_k exp(-j\hat{\psi}_k)$$

and $$\hat{\psi}_{k+1} = \psi_K + \delta w_k - \beta e_k \mod 2\pi \; \delta w_k = \delta w_{k-1} - \alpha e_k \mod 2\pi$$

where $\beta$ is the step of the gradient and corresponds to a loop gain. $\alpha$ is also a loop parameter. It may be so chosen that $\alpha = \beta^2/2$.

This decision-based system does not resolve the problem of phase ambiguity. Its convergence is relatively slow when noise is significant.

SUMMARY OF THE INVENTION

The object of the invention is to resolve these problems.

To this end the present invention proposes a method of coherent demodulation for phase shift keying includes:
- a phase estimation stage based on a sequence of reference symbols transmitted at the start of each block of data:
- then a second order phase-locked loop stage.

It likewise proposes a device for implementing this method, including:
- a circuit for phase estimation based on the reference symbols;
- a second order phase-locked loop.

The phase estimation circuit advantageously comprises in succession:
- a delay circuit:
- a first multiplier circuit receiving at its second input the input signal of the delay circuit passed through a multiplier circuit, an adder-accumulator circuit and a conversion circuit:

This circuit further includes:
- a synchronizing circuit for the reference sequence, connected to:
  - the conversion circuit:
  - the adder-accumulator circuit:
  - and a sequence coding circuit whose outputs are applied to the second inputs of the multiplier circuit.

This device allows satisfactory reception for poor signal-to-noise ratios. It is particularly suited to transmission systems using a fading channel as well as to systems where security is essential. It enables the phase ambiguity to be resolved and also allows the frequency to be tracked efficiently in assuming independently effected synchronization of the symbols.

BRIEF DESCRIPTION OF THE DRAWINGS

The characteristics and advantages of the invention will be clear from the description which follows, by way of non-limiting example, with reference to the accompanying Figure, which illustrates the apparatus according to the present invention.

DETAILED DESCRIPTION OF THE PREFERRED EMBODIMENTS

In the method of demodulation of the invention, transmission of a sequence of reference signals at the beginning of each block allows the phase to be estimated by channel estimation. A phase-locked loop referred to as "decision-directed" then takes over for the rest of the time so far as the phase estimation is concerned. A suitable control system enables two estimators to be used in succession. The frequency tracking itself is permanently ensured by the loop.

To explain the method the noise will be ignored, so that the estimates can be considered to be perfect.

$$r_k = \exp(j(k\delta w + \phi_k))s_k$$

The estimate of $\delta w$ is used to eliminate the residual frequency, the signal being then designated $u_k$.

$$u_k = \exp(j\phi_k)s_k$$

The component $\phi_k$ is then eliminated; this may be done in two ways:
- either after receiving the reference symbols by the channel estimator, setting $\hat{\phi}_k$ to zero in the phase-locked loop,
- or by this loop for the rest of the time, maintaining the correction by the channel estimator. The calculation of the channel estimate requires $R = 2r+1$ iterations and corresponds to estimation at the time $r+1$ (at the center of the reference sequence); accordingly by delaying $u_k$ by $(r+1)T_s$, we obtain the signal $v_k$ after phase correction such that:

$$v_k = u_{k-r-1} \frac{\hat{h}^*_{r+1}}{|\hat{h}_{r+1}|} = \exp((j\hat{\phi}_{k-r-1} - \phi_{r+1}))s_{k-r-1} =$$

$$\exp(j\Delta\phi_k)s_{k-r-1}$$

$$v_R = s_{r+1} \text{ because } \Delta\phi_R = 0$$

At the iteration $k = r$, the signal $v_k$ is perfectly corrected in phase. At this moment it is necessary to force the phase estimate of the loop to zero:

$$\Delta\hat{\phi}_R = 0.$$

The signal $v_k$ should subsequently be corrected in phase by the loop to form $w_k$:

$$w_k = \exp(-j\Delta\hat{\phi}_k) = s_{k-r-1}$$

$e_k$ is then generated from $w_k$ to form $\hat{\delta}_w$ and $\hat{\Delta\phi}$.

The device for implementing this method, illustrated in the Figure and corresponds to a wired logic structure but its conversion into a microprogrammed structure is immediately at hand.

The double lines represent complex signals while the single lines represent real signals. The arrows indicate the order in which the operations are performed.

This device comprises:
- a phase estimation circuit 10 based on the reference symbols;
- a second order phase-locked loop 20 referred to as "decision directed": the circuit 10 is interposed between two members of this loop 20.

The loop 20 comprises in succession:
- a first multiplier circuit 21 for frequency compensation;
- a second multiplier circuit 22 for phase compensation;
- a dual comparator 23 which provides the signal $\hat{s}_k$;
- a third multiplier circuit 24 which receives on its second inputs the input signals to the dual comparator 23 passed through a conjugating circuit 25;
- a circuit 26 selecting the imaginary part;
- a first feedback path comprising:
  - a fourth multiplier circuit 27 multiplying by $\alpha$,
  - a first adder-accumulator circuit 28 including a delay $T_s$ ($T_s$: symbol time);
  - a second adder-accumulator circuit 29; likewise including a delay $T_s$;

a conversion circuit 30 whose outputs are connected to the second inputs of the first multiplier circuit 21.

and a second feedback path comprising:
a fifth multiplier circuit 31 multiplying by $\beta$;
a third adder-accumulator circuit 32;
a conversion circuit 33 whose outputs are connected to the second inputs of the second multiplier circuit 22.

The first circuit 10, which is interposed between the first and the second multiplier circuits (21, 22) comprises in succession, between the two multiplier circuits:
a delay circuit 11 with delay $(r+1)T_s$;
a first multiplier circuit (12) which receives on its second inputs the output signal of the first multiplier circuit 21 of the loop 20 passed through a second multiplier circuit 13, through an adder-accumulator circuit 14 and through a conversion circuit 15.

The first circuit 10 also comprises:
a reference sequence synchronization circuit 16 which is connected to:
the third adder-accumulator circuit 32 of the loop 20;
the conversion circuit 15;
the adder-accumulator circuit 14 of the circuit 10;
and a sequence coding circuit 17 whose outputs are connected to the second inputs of the second multiplier circuit 13 of the circuit 10.

The synchronization circuit 16 actually generates several signals:
a zeroing signal for the adder-accumulator circuit 14, at the instant 1 (start of the reference sequence):
an enabling signal during R symbols from 1 to R, enabling the generation of the reference signals $s^*_k$ at the output of the circuit 17;
a conversion command signal for the circuit 15,
as well as a zeroing signal for the adder-accumulator circuit 32, at the end of the reference sequence.

In the operation of the device of the invention, the signal $u_k$, corresponding to the signal $r_k$ with the residual frequency suppressed by means of the first multiplier circuit 11, is multiplied in the multiplier circuit by the conjugate reference signal $s^*_k$ generated by the circuit 17. The sum of these successive products is then formed in the adder-accumulator 14. This is reset to zero by the circuit 16 at the start of each block. At the end of the sequence the value $\hat{R}_h$ is obtained at the output of the circuit 14, conversion of this value being effected with the aid of the circuit 15, which may be a ROM associated with a latch retaining the output:

$$\frac{\hat{h}^*}{|\hat{h}|},$$

for the duration of the block.

$u_k$ is delayed by $r+1$ symbols in the circuit 11, then the phase correction is made by multiplying $u_{k-r-1}$ in 12 by $$\frac{\hat{h}^*}{|\hat{h}|}$$

to form $v_k$.

$w_k$ is obtained in the loop 20 by multiplying $v_k$ by $\exp(-j\Delta\hat{\phi})$ in 22. $s_k$ is estimated by calculating the sign of $w_k$ (23), which corresponds to a dual comparator (real and imaginary paths). $w^*_k$ formed by forming the conjugate of $w_k$ (25) is multiplied (24) by the signal $\hat{s}_k$ coming from the circuit 23.

The imaginary part of the result of the multiplication is then extracted (26) to form $e_k$.

$e_k$ is then multiplied by $\beta$ and then the sum of the successive elements output by this product (31) is formed by the adder-accumulator circuit 32. This circuit is periodically reset to zero by the circuit 16 at the end of the reception of each reference sequence. The output of this circuit provides $\Delta\hat{\phi}$ which then undergoes conversion from polar to Cartesian coordinates in the circuit 33, which can be implemented with the aid of a ROM. The output of the adder-accumulator circuit 33, which is written: $\exp(-j\Delta\hat{\phi})$, is directly applied to the multiplier circuit 22.

On the other hand, the product of $e_k$ and $\alpha$ (27) is applied to the input of the adder-accumulator circuit 28. This circuit forms the sum of the successive products to form $\hat{\delta}w$.

The estimate of $\delta w$ is itself added successively into the adder-accumulator circuit 29 to form $(k\hat{\delta}w)\mod 2\pi$. This angle is then converted into $\exp(-j\hat{\delta}w)$ by the circuit 30, which is identical to the circuit 33. The output of this circuit is then applied to the multiplier circuit 21.

If $\delta wR < \pi$, it is possible to effect a channel estimation of before the frequency compensation of the loop 20, which does not alter the principle of synchronization of these two structures. It is noted that this modification also allows omission of the circuits 29, 30 and 21 shown in the figure, by adding the output signal of the circuit 28 to the output signal of the circuit 31.

The performance of this demodulation device is remarkable; thus:

The resistance to Gaussian noise is substantially the same as for the channel estimation alone.

The phase ambiguity is removed, which allows transition coding to be dispensed with, the chief drawback of which is the increase in the error rate.

The behavior in the face of a residual frequency component is identical to that of the "decision-directed" loop, with a second order filter having the same parameters. Good operation can be obtained with $\delta w/2\pi < 0.1$ and fair operation with $0.1 < \delta w/2\pi < 0.2$ with the risk of false capture when $[E_b/N_o]d_B < 20$. ($E_b/N_o$: signal to noise ratio).

In the case in which the residual frequency component is small, the convergence is identical to that of the channel estimation, that is to say less than the size of a block, once the reference synchronization is acquired. In the contrary case, the convergence is however accelerated relative to the "decision-directed" loop, all things furthermore being equal, and in a more pronounced way when the noise is significant.

It is clear that the present invention has only been described and shown by way of a preferred example and that its constituent parts may be replaced by equivalent parts without thereby leaving the scope of the invention.

We claim:

1. A method of compensating for phase and frequency deviations for coherent demodulation of a phase-shaft keyed signal, said phase-shift keyed signal comprises a sequence of reference symbols arranged periodically with data symbols, said method comprising the steps of:

periodically performing first order estimation of phase deviation of said phase-shift keyed signal introduced by a transmission channel by correlating said reference symbols with expected symbols identical to said reference symbols;

performing first phase compensation of said phase-shift keyed signal based upon a result of said first estimation step;

performing a second estimation of phase deviation and performing estimation of frequency deviation of said phase-shift keyed signal, after said first phase compensation step, based upon said reference symbols and said data symbols; and performing second phase compensation and frequency compensation of said phase-shift keyed signal via a phase-locked loop which compensates, for each symbol received, the phase and frequency deviations estimated in the second estimation step.

2. The method according to claim 1, wherein said first phase compensation step comprises the step of complex multiplying said phase-shift keyed signal by a conjugate of a cross correlation normalized to unity.

3. The method according to claim 1, further comprising the step of setting the phase of said second estimation step to zero during said first phase compensation step.

4. An apparatus for compensating for phase and frequency deviations of a coherent demodulated phase-shift keyed signal comprising reference symbols arranged periodically between data symbols, said apparatus comprising:

a first order phase estimation circuit (10) comprising means for estimating said phase deviation of said phase-shift keyed signal introduced into said apparatus via a transmission channel, phase estimation being periodically effected by correlating said reference symbols with expected symbols identical to said reference symbols; and a second order phase-locked loop (20) for performing phase and frequency compensation comprising a first complex multiplier circuit (21) for performing frequency compensation and a second complex multiplier circuit (22) for performing phase compensation;

said first order phase estimation circuit (10) being interposed between said first complex multiplier circuit (21) and said second complex multiplier circuit (22).

5. The apparatus according to claim 4, wherein said first order phase estimation circuit (10) comprises:

a delay circuit (11) connected to an output of said first complex multiplier circuit (21);

a third complex multiplier circuit (12) comprising first inputs and second inputs, wherein said first inputs are connected to an output of said delay circuit (11);

a fourth complex multiplier circuit (13) comprising first inputs and second inputs, wherein said first inputs are connected to said output of said first complex multiplier circuit (21);

a first adder-accumulator circuit (14) connected to an output of said fourth complex multiplier circuit (13);

a conversion circuit (15) coupled to said first adder-accumulator circuit (14) and said third complex multiplier circuit (12);

a sequence coding circuit (17); and a circuit (16) for synchronizing the phase-shift keyed signal, wherein said circuit 16 is connected to said conversion circuit (15), said first adder-accumulator (14), said sequence coding circuit (17), and said second order phase-locked loop (20), outputs of said sequence coding circuit (17) being connected to said second inputs of said fourth complex multiplier circuit (13), wherein said phase-shift keyed signal is supplied to said third complex multiplier circuit (12) via said fourth complex multiplier (13), said first adder-accumulator (14) and said conversion circuit (15), said third complex multiplier circuit (12) further being arranged to receive on said first input said phase-shift keyed signal output after being delayed by said delay circuit.

6. A method of coherent demodulation of a phase-shift keyed signal comprising reference symbols arranged periodically between data symbols, said method comprising the steps of:

setting a phase estimate of a phase-locked loop to zero;

performing channel estimation phase deviation for said phase-shift keyed signal, introduced by a transmission channel, by correlating said reference symbols with expected symbols identical to said reference symbols, said channel estimation being performed at an end of each sequence of reference symbols;

performing phase error compensation by complex multiplying a signal resulting from said channel estimation by a conjugate of a cross correlation normalized to unity;

supplying a signal wherein said phase error has been compensated in said phase error compensation step to a second order phase-locked loop; and compensating for phase and frequency deviation via said second order phase-lock loop.

* * * * *